United States Patent

Oka

Patent Number: 5,220,412
Date of Patent: Jun. 15, 1993

[54] COLOR SIGNAL CONVERTING CIRCUIT

[75] Inventor: Kenichiro Oka, Kamakura, Japan

[73] Assignee: Mitsubishi Denki Kabushiki Kaisha, Tokyo, Japan

[21] Appl. No.: 561,324

[22] Filed: Aug. 1, 1990

[30] Foreign Application Priority Data

Feb. 9, 1990 [JP] Japan .................................. 2-28499

[51] Int. Cl.$^5$ ............................................. H04H 9/67
[52] U.S. Cl. ........................................ 358/30; 358/80
[58] Field of Search .............................. 358/30, 75, 80

[56] References Cited

U.S. PATENT DOCUMENTS 4,758,885 7/1988 Sasaki et al. .......................... 358/80

FOREIGN PATENT DOCUMENTS

| 0081415 | 6/1983 | European Pat. Off. . |
| 440876A | 8/1991 | European Pat. Off. . |
| 2521322 | 8/1083 | France . |
| 2535567 | 5/1984 | France . |
| 2143694A | 6/1990 | Japan . |

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

A color signal converting circuit which is simplified in circuit construction and is high in operating speed. The color signal converting circuit has a plurality of input terminals and a plurality of output terminals and comprises only a plurality of addition/subtraction operators for dealing with signals all in the form of integral numbers and for dealing with signals all in the form of integral numbers and for converting signals of a first color signal system received by way of the input terminals into signals of a second color signal system in accordance with conversion expressions each including only $2^{-n}$ (n is an integer) as a coefficient. The signals obtained form the addition/subtraction operators are outputted from the output terminals.

10 Claims, 4 Drawing Sheets

>>n: Signal lines to be connected to lower inputs displaced by n-bit places 4, 5, 6, 7, 8: Addition/substraction >>n represents rightward shifting operation by n-bits

COLOR SIGNAL CONVERTING CIRCUIT

BACKGROUND OF THE INVENTION

1. Field of the Invention

This invention relates to a color signal converting circuit for image processing, particularly for image compression, in an apparatus which deals with image data such as a color printer and a color digital copying machine.

2. Discussion of the Background

Various color signal converting systems are conventionally known, and a converting system between an RGB signal system and a YIQ signal system as one of such conventional color signal converting systems is employed, for example, in an NTSC system. Such a converting system is disclosed, for example, in "New Edition of Color Science Handbook", edited by the Chromatics Society of Japan and published by Tokyo University Press, Feb. 25, 1980, p. 926.

First, expressions for converting signals of an RGB signal system into signals of a YIQ signal system are given below.

$$Y = 0.30R + 0.59G + 0.11B \quad (1)$$

$$I = 0.74(R-Y) - 0.27(B-Y) \quad (2)$$

$$Q = 0.48(R-Y) + 0.41(B-Y) \quad (3)$$

Expressions for converting signals of a YIQ signal system into signals of an RGB signal system reverse to the conversion expressions given above are given below.

$$R = Y + 0.95I + 0.62Q \quad (4)$$

$$G = Y - 0.27I - 0.64Q \quad (5)$$

$$B = Y - 1.11I + 1.72Q \quad (6)$$

Here, R, G and B are signals of primary colors representing red, green and blue, respectively, while Y is a luminance signal and I and Q are color difference signals.

Circuit construction for such conversions as given by the conversion expressions (1) to (3) and the reverse conversion expressions (4) to (6) above is examined here.

The expressions (1) to (6) above each include a coefficient of a decimal number to a signal. Accordingly, it is necessary to deal with data in the form of floating-point numbers and include operators which execute additions, subtractions and multiplications.

Such a conventional color signal converting circuit as described above has several problems that circuit construction is complicated and the calculating speed is low because a large number of bits in binary number are required for the operation of a decimal number.

SUMMARY OF THE INVENTION

It is an object of the present invention to provide a color signal converting circuit which is simplified in circuit construction and is high in operating speed.

In order to attain the object, according to the present invention, there is provided a color signal converting circuit having a plurality of input terminals and a plurality of output terminals, which comprises a plurality of addition/subtraction operators for dealing with signals all in the form of integral numbers and for converting signals of a first color signal system received by way of the input terminals into signals of a second color signal system in accordance with conversion expressions each including only $2^{-n}$ as a coefficient, n being an integer, the signals obtained from the addition/subtraction operators being outputted from the output terminals. Each signal line for a coefficient of $2^{-n}$ is connected to one of inputs of an associated one of the addition/subtraction operators displaced by n-bit places to the lower order.

With the color signal converting circuit, only conversion expressions which include $2^{-n}$ as a coefficient are used. Consequently, the color signal converting circuit deals with signals all in the form of integral numbers. Further, since multiplications are replaced with bit shifts, multiplicators are eliminated. Further, since the color signal converting circuit comprises only such a plurality of addition/multiplication operators for dealing with signals all in the form of integral numbers and for converting signals of a first color signal system received by way of the input terminals into signals of a second color signal system in accordance with conversion expressions each including only $2^{-n}$ as a coefficient, the circuit construction is simple and the operation speed is high.

BRIEF DESCRIPTION OF THE DRAWINGS

The above and other objects, features and advantages of the present invention will become apparent from the following description and the appended claims, taken in conjunction with the accompanying drawings.

In the Drawings.

DESCRIPTION OF THE PREFERRED EMBODIMENTS

Figure 1:
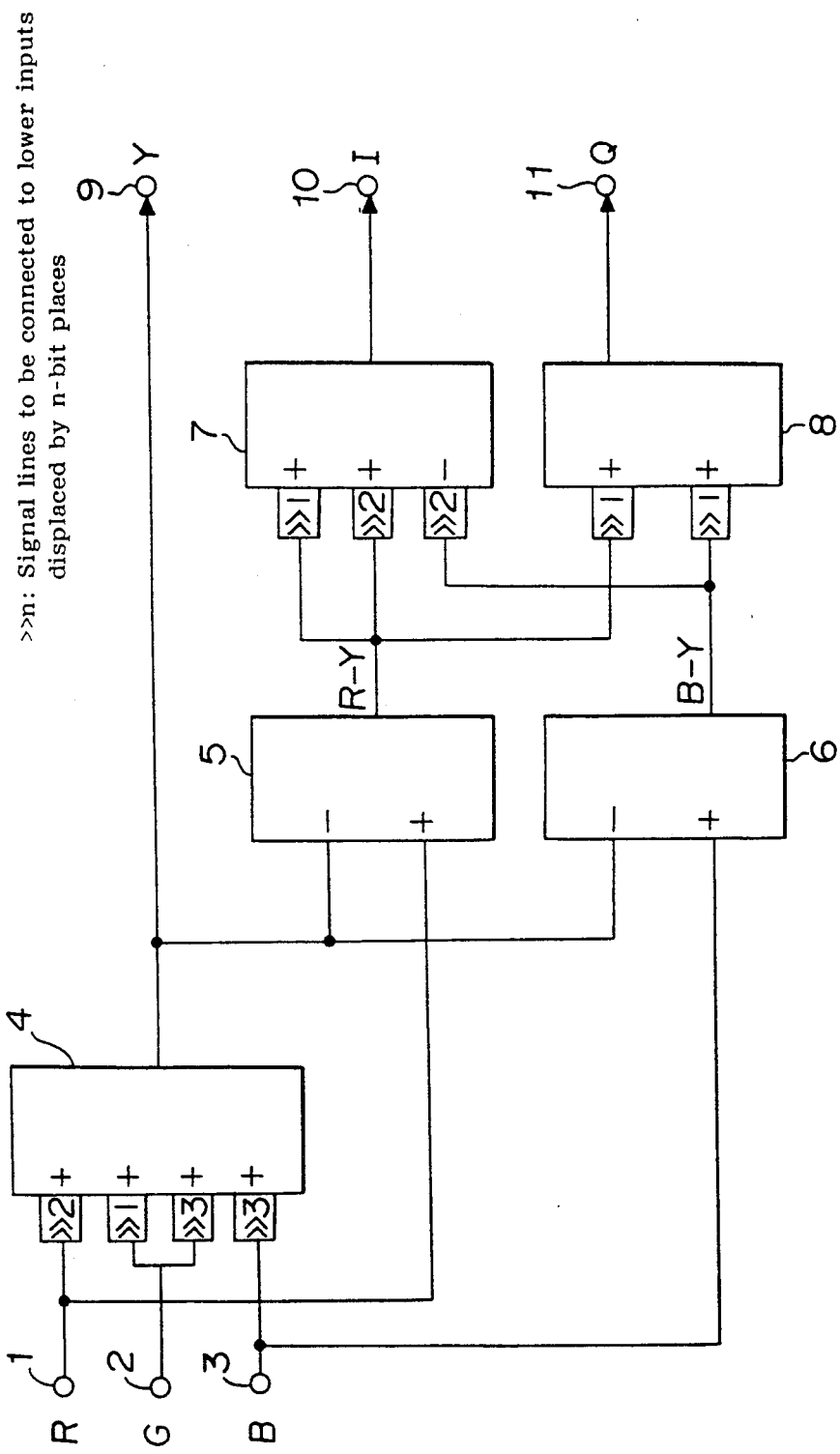
FIG. 1 is a circuit diagram of a color signal converting circuit showing a first preferred embodiment of the present invention.

Referring first to FIG. 1, there is shown a color signal converting circuit for converting signals of an RGB signal system into different signals of a YIQ signal system according to the present invention. The color signal converting circuit shown includes an R signal input terminal 1, a G signal input terminal 2, a B signal input terminal 3, an addition/subtraction operator 4 connected to the R, G and B signal input terminals 1, 2 and 3, another addition/subtraction operator 5 connected to the addition/subtraction operator 4 and the R signal input terminal 1, a further addition/subtraction operator 6 connected to the addition/subtraction operator 4 and the B signal input terminal 3, a still further addition/subtraction operator 7 connected to the addition/subtraction operators 5 and 6, a yet further addition/subtraction operators 5 and 6, a Y signal output terminal 9 connected to the addition/subtraction operator 4, an I signal output terminal 10 connected to the addition/subtraction operator 7, and a Q signal output terminal 11 connected to the addition/subtraction operator 8.

Figure 2:
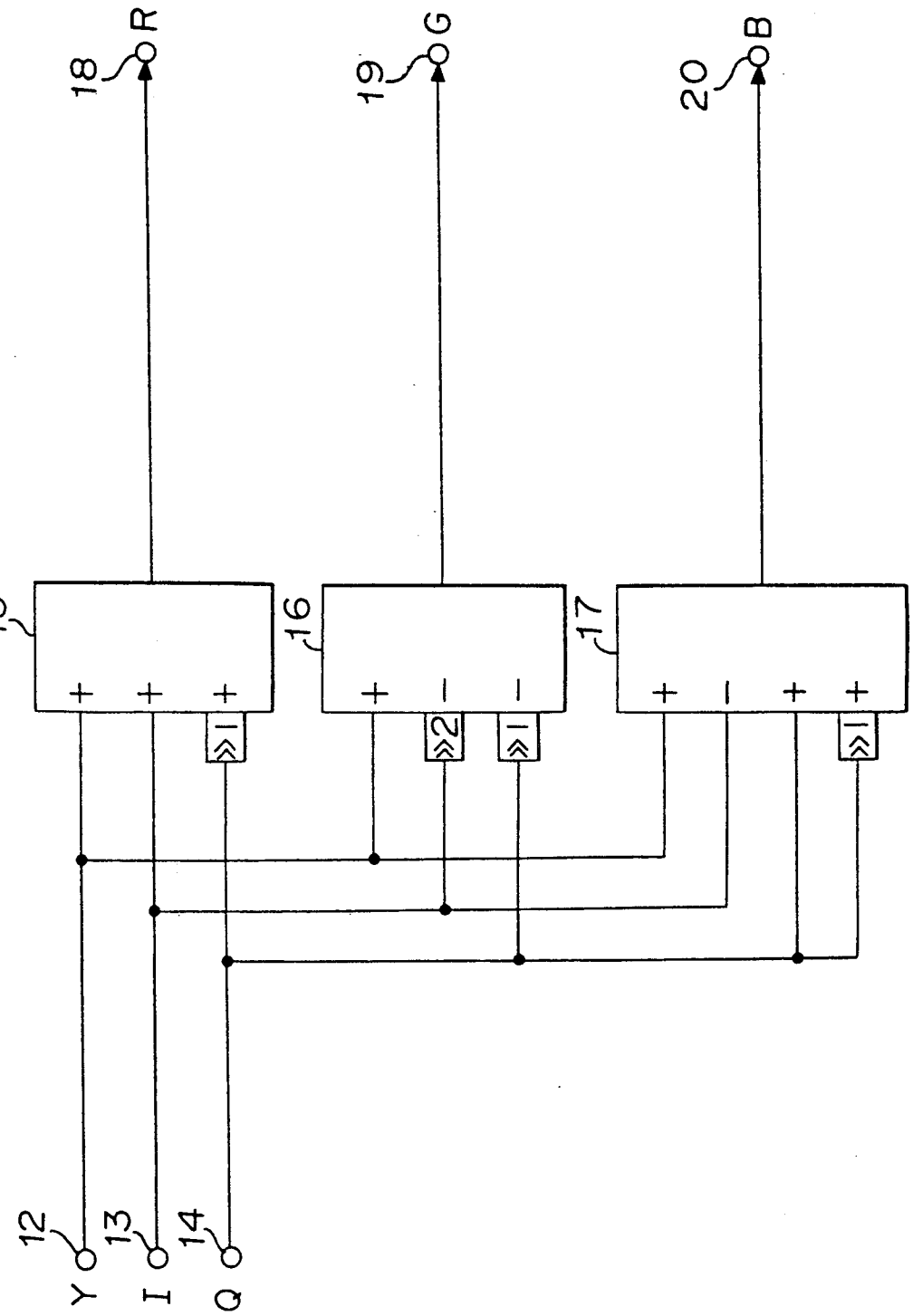
FIG. 2 is a circuit diagram of another color signal converting circuit showing a second preferred embodiment of the present invention.

Referring now to FIG. 2, there is shown a color signal converting circuit for reversely converting signals of a YIQ signal system to different signals of an RGB signal system according to another embodiment of the present invention. The color signal converting circuit shown includes a Y signal input terminal 12, an I signal input terminal 13, a Q signal input terminal 14 an addition/subtraction operator 15 also connected to the Y, I and Q signal input terminals 12, 13 and 14, another addition/subtraction operator 16 also connected to the Y, I and Q signal input terminals 12, 13 and 14, a further addition subtraction operator 17 also connected to the Y, I and Q signal input terminals 12, 13 and 14, and R signal output terminal 18 connected to the addition/subtraction operation 15, a G signal output terminal 19 connected to the addition/subtraction operator 16, and a B signal output terminal 20 connected to the addition/subtraction operator 17.

Subsequently, operation of the color signal converting circuits of the embodiments described above will be described.

The circuits shown in FIGS. 1 and 2 are constructed so as to execute operations of expressions which are obtained by approximation of the conversion expressions (1) to (3) and the reverse conversion expressions (4) to (6). The conversion expressions (1) to (3) are approximated into approximate expressions (7) to (9), respectively, while the conversion expressions (4) to (6) are approximated into approximate expressions (10) to (12), respectively, as given below.

$$Y = 2^{-2}R + (2^{-1} + 2^{-3})G + 2^{-3}B \quad (7)$$

$$I = (2^{-1} + 2^{-2}) \cdot (R - Y) - 2^{-2}(B - Y) \quad (8)$$

$$Q = 2^{-1}(R - Y) + 2^{-1}(B - Y) \quad (9)$$

$$R = Y + I + 2^{-1}Q \quad (10)$$

$$G = Y - 2^{-2}I - 2^{-1}Q \quad (11)$$

$$B = Y - I + (1 + 2^{-1})Q \quad (12)$$

The method of setting of an approximate expression is to replace a coefficient to a signal with a number of the type $2^{-n}$ or a combination of numbers of such type. First, where n is equal to or smaller than 3, such approximate expressions as given by the expressions (7) to (9) are obtained from the conversion expressions (1) to (3), respectively.

Approximate expressions to the reverse conversion expressions (4) to (6) are considered on condition that, if R, G and B signals are converted once into Y, I and Q signals in accordance with the expressions (7) to (9) and then reverse conversion is executed for the Y, I and Q signals thus obtained, then R, G and B signals of the same values with original values of the R, G and B signals should be obtained. In this instance, the expression (10) is obtained for R and the expression (12) meet the requirement that n should be equal to or smaller than 3. However, the reverse conversion expression (11) for G should naturally be such as the following expression (13).

$$G = Y - 0.2I - 2^{-1}Q \quad (13)$$

The coefficient of 0.2 to I in the expression (13) is not a value which can be produced by an addition or additions and/or a subtraction or subtractions of $2^{-n}$ type on condition that n is equal to or smaller than 3. Thus, the expression (11) is considered using $2^{-2}$ in place of 0.2. In this instance, a value of G obtained by such reverse conversion will be a little different from the original value thereof. However, a result of simulation has proved that a change in color which arises from such a small difference in value is such a small amount as cannot be discriminated with an eye of a human being.

Also it has been confirmed that, even when image processing is executed for Y, I and Q signals after execution of the approximation conversions (7) to (9) and then the Y, I and Q signals are converted back into R, G and B signal by the approximation reverse conversions (10) to (12), respectively, there is only such a small difference as does not allow an eye of a human being to discriminate a difference in color comparing with the case wherein image processing is executed using the conversions (1) to (3) of the definition and the reverse conversions (4) to (6) of the definition.

Subsequently, means for constructing a circuit in accordance with the approximate expressions will be described. An item having a coefficient of $2^{-n}$ in each approximate expression is equivalent to an operation of shifting digital data by n-bit places to the right. An operation of shifting digital data in each item by n-bit places to the right can be achieved by connecting, at a stage in constructing a circuit wherein signal lines for a digital data signal are coupled to operators for effecting an addition or additions and/or a subtraction or subtractions between items, the signal lines in a displaced relationship by n-bit places to the lower order. In short, no operating elements for the exclusive use are required for the shifting operation. Portions indicated by >>n in FIGS. 1 and 2 represent those portions for which signal lines should be connected in such a displaced relationship as described above.

After all, when a circuit is constructed for the approximate expressions, it can be constructed only from operators each of which executes an addition or additions and/or a subtraction or subtractions. Further, every signal can be dealt with in the form of an integral number.

Detailed operation of the color signal converting circuits of the embodiments described above will be described with reference to FIGS. 3 and 4.

Figure 3:
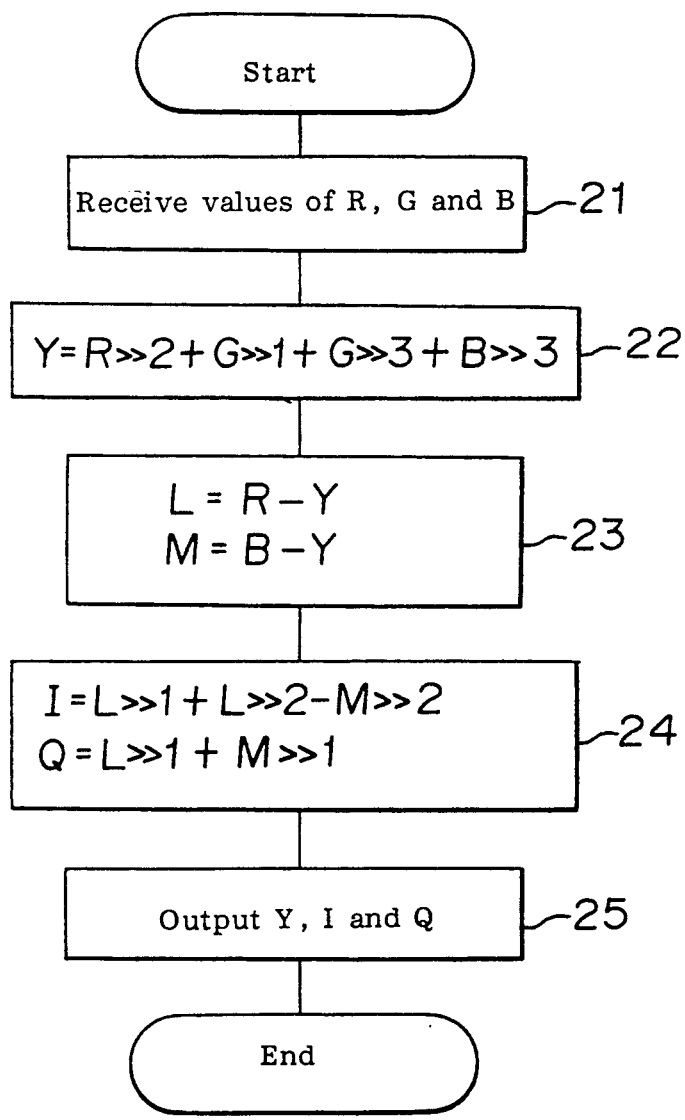
FIG. 3 is a flow chart illustrating operation of the color signal converting circuit shown in FIG. 1.

Referring first to FIG. 3 which illustrates operation of the color signal converting circuit shown in FIG. 1, values of R, G and B signals are first received at the R, G and B input terminals 1, 2 and 3, respectively, at step 21.

Then at step 22, a value of Y is calculated on the addition/subtraction operator 4 in accordance with the conversion expression (7).

Subsequently, at steps 23 and 24, values of I and Q are calculated on the addition/subtraction operators 5, 7 and 6, 8 in accordance with the conversion expressions (8) and (9), respectively.

Finally at step 25, the thus calculated values of Y, I and Q are outputted from the Y, I and Q output terminals 9, 10 and 11, respectively.

Figure 4:
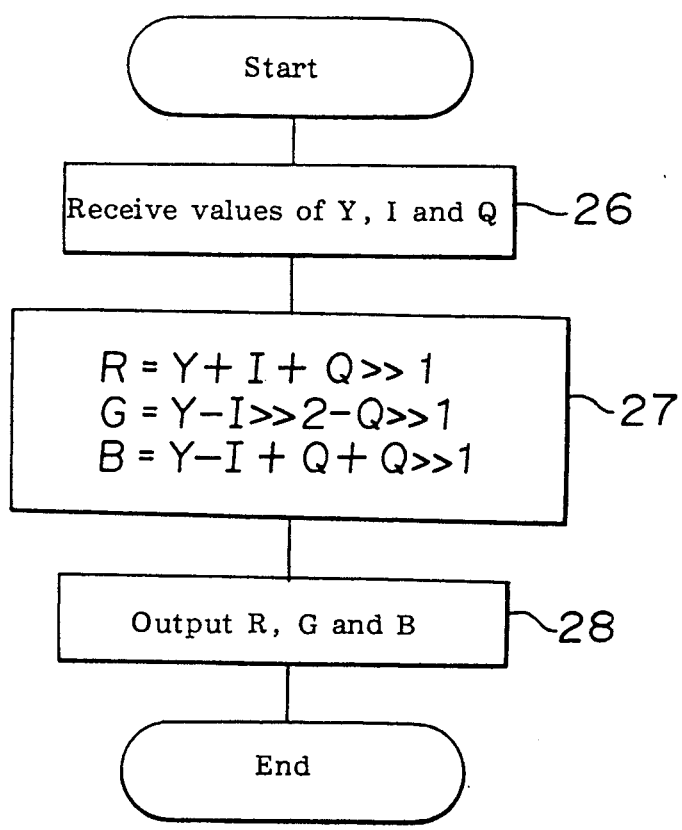
FIG. 4 is a flow chart illustrating operation of the color signal converting circuit shown in FIG. 2.

Referring now to FIG. 4 which illustrates operation of the color signal converting circuit shown in FIG. 2, values of Y, I and Q are first received at the Y, I and Q input terminals 12, 13 and 14, respectively, at step 26.

Then at the step 27, values of R, G and B are calculated on the addition/subtraction operators 15, 16 and 17 in accordance with the reverse conversion expressions (10), (11) and (12), respectively.

Finally at step 28, the values of R, G and B thus obtained are outputted from the R, G and B output terminals 18, 19 and 20, respectively.

Since the color signal converting circuits of the embodiments of the present invention make approximation of a signal conversion expression replacing a coefficient with a shifting operation, they require no multiplicator and can deal with signals all in the form of integral numbers. Accordingly, the color signal converting circuits are advantageous in that the circuit construction is simple and the operation speed is high.

It is to be noted that, while a coefficient in any approximate expression in the embodiments described above is constituted from a combination of $2^{-n}$ wherein n is equal to or smaller than 3, a similar operation can be anticipated even with a condition other than the condition that n is equal to or smaller than 3.

Further, while R, G and B signals in combination are considered as signals of primary colors in the embodiments described hereinabove, the expected object can naturally be attained with signals of some other primary colors such as Y (yellow), M (magenta) and C (cyan).

In addition, while I and Q are considered as color difference signals in the embodiments described hereinabove, another signal system such as R-Y and B-Y or Cr and Cb may be employed instead.

I claim:

1. A color signal converting circuit comprising:
   a plurality of input terminals for receiving signals of a first color signal system;
   a plurality of addition/subtraction operators for receiving the signals of the first color signal system received at the plurality of input terminals, each of said plurality of addition/subtraction operators converting said signals of the first color signal system into output signals of a second color signal system by multiplying said signals of the first color signal system by coefficients of $2^{-n}$, n being an integer; and
   a plurality of output terminals for outputting said output signals of the second color signal system.

2. The color signal converting circuit according to claim 1, wherein said signals of the first color signal system are of an RGB color signal system, and said plurality of addition/subtraction operators convert the signals of the RGB color signal system into output signals of the second color signal system which is a YIQ color signal system.

3. The color signal converting circuit according to claim 2, wherein said plurality of addition/subtraction operators comprise a first addition/subtraction operator for receiving the signals input to said plurality of input terminals, a second addition/subtraction operator for receiving an output of said first addition/subtraction operator and a first one of said input terminals for a signal of R, a third addition/subtraction operator and a third one of said input terminals for a signal of B, a fourth addition/subtraction operator for receiving an output of said second and third addition/subtraction operators, and a fifth addition/subtraction operator also for receiving an output of said second and third addition/subtraction operator.

4. The color signal converting circuit according to one of claims 2 or 3, wherein said plurality of addition/subtraction operators execute conversions of signals of the RGB color signal system into signals of the YIQ color signal system in accordance with the following expressions:

$$Y = 2^{-2}R + (2^{-1}+2^{-3})G + 2^{-3}B$$

$$I = (2^{-1}+2^{-2})\cdot(R-Y) - 2^{-2}(B-Y)$$

$$Q = 2^{-1}(R-Y) + 2^{-1}(B-Y).$$

5. The color signal converting circuit according to claim 1, wherein said signals of the first color signal system are of a YIQ color signal system, and said plurality of addition/subtraction operators convert the signals of the YIQ color signal system into output signals of the second color signal system which is an RGB color signal system.

6. The color signal converting circuit according to claim 5, wherein said addition/subtraction operators comprise a first addition/subtraction operator for receiving the signals input to the plurality input terminals, a second addition/subtraction operator also for receiving the signals input to the plurality of input terminals, and a third addition/subtraction operator also for receiving the signals input to the plurality input terminals.

7. The color signal converting circuit according to claim 5, wherein said plurality of addition/subtraction operators execute conversions of signals of the YIQ color signal system into signals of the RGB color signal system in accordance with the following expressions:

$$R = Y + I + 2^{-1}Q$$

$$G = Y - 2^{-2}I - 2^{-1}Q$$

$$B = Y - I + (1 + 2^{-1})Q.$$

8. A color signal converting circuit comprising:
   a plurality of input terminals for receiving signals of a RGB color system, a first input terminal receiving a R signal of the RGB color system, a second input terminal receiving a G signal of the RGB color system and a third input terminal receiving a B signal of the RGB color system;
   a first addition/subtraction operator for receiving the R, G and B signals from the respective first, second and third input terminals and for converting the R, G and B signals from the respective first, second and third input terminals into an output Y signal of a YIQ color system;
   a second addition/subtraction operator for receiving the output Y signal from the first addition/subtraction operator and the R signal from the first input terminal, and for converting the received Y and R signals into a R-Y signal;
   a third addition/subtraction operator for receiving the output Y signal from the first addition/subtraction operator and the B signal from the third input terminal, and for converting the received Y and B signals into a B-Y signal;
   a fourth addition/subtraction operator for receiving the R-Y signal output from the second addition/subtraction operator and the B-Y signal output from the third addition/subtraction operator and converting the received R-Y and B-Y signals into an output I signal of the YIQ color system; and
   a fifth addition/subtraction operator for receiving the R-Y signal output from the second addition/subtraction operator and the B-Y signal output from the third addition/subtraction operator and converting the received R-Y and B-Y signals into an output Q signal of the YIQ color system.

9. The color signal converting circuit according to claim 8, wherein said plurality of addition/subtraction operators execute conversion of signals of the RGB color signal system into signals of the YIQ color signal system in accordance with the following expressions:

$$Y = 2^{-2}R + (2^{-1} + 2^{-3})G + 2^{-3}B$$

$$I = (2^{-1} + 2^{-2}) \cdot (R - Y) - 2^{-2}(B - Y)$$

$$Q = 2^{-1}(R - Y) + 2^{-1}(B - Y).$$

10. A color signal converting circuit comprising:
a plurality of input terminals for receiving signals of a YIQ color system, a first input terminal receiving a Y signal of the YIQ color system, a second input terminal receiving an I signal of the YIQ color system, and a third input terminal receiving a Q signal of the YIQ color system;
a first addition/subtraction operator for receiving the Y, I and Q signals from the respective first, second and third input terminals and for converting the Y, I and Q signals into an output R signal of a RGB color system according to the expression, $$R = Y + I + 2^{-1}Q;$$

a second addition/subtraction operator for receiving the Y, I and Q signals from the respective first, second and third input terminals and for converting the Y, I and Q signals into an output G signal of the RGB color system according to the expression, $$G = Y - 2^{-2}I - 2^{-1}Q;$$ and a third addition/subtraction operator for receiving the Y, I and Q signals from the respective first, second and third input terminals and for converting the Y, I and Q signals into and output B signal of the RGB color system according to the expression, $$B = Y - I + (1 + 2^{-1})Q.$$

* * * * *